Dec. 3, 1929.    C. R. TOST    1,738,407
LINK CHAIN
Filed Oct. 16, 1928

Inventor
Charles R. Tost
by Roberts Cushman & Woodberry
Attys.

Patented Dec. 3, 1929

1,738,407

UNITED STATES PATENT OFFICE

CHARLES R. TOST, OF CENTERDALE, RHODE ISLAND, ASSIGNOR TO THE HADLEY COMPANY, OF PROVIDENCE, RHODE ISLAND, A CORPORATION OF RHODE ISLAND

LINK CHAIN

Application filed October 16, 1928. Serial No. 312,824.

Wrist watch bracelets of the link type and other jewelry chains have been provided with various kinds of adjustable buckles, clasps and other connections whereby the bracelet or the like may be adjusted in length at one or both ends, but such adjustments have not been satisfactory for various reasons, chief of which are that the adjusting means is either too bulky or unsightly or is too limited in its range of adjustment. Objects of the present invention are to eliminate these objections and to provide a bracelet or other chain which has an unlimited range of adjustment and which at the same time has no visible means of adjustment whatsoever, which may be readily adjusted to any length with no tool or instrument other than an ordinary pin or hairpin, which has simple connectors at the ends free from adjusting means, which is neat and attractive in appearance, which is smooth and comfortable when worn as a bracelet, and which is generally superior to prior bracelets.

For the purposes of illustration one concrete embodiment of the invention is shown in the accompanying drawings, in which.

Figure 1:
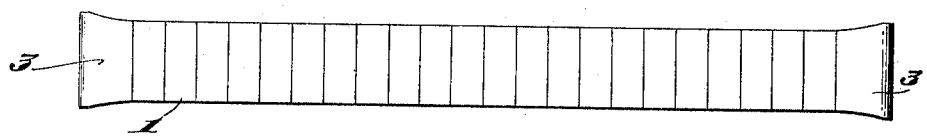
Fig. 1 is an outside plan view of the wrist watch bracelet.
Figure 2:
Fig. 2 is an edge view of the bracelet.

The particular embodiment of the invention chosen for the purpose of illustration comprises a plurality of links 1 pivotally interconnected by means of pivot pins 2. The end links or connectors 3 are of the simple snap type which hook over the bars ordinarily provided on wrist watches.

Each link 1 comprises a front plate having down-turned ends 4 provided with integral lips or ears 5 and 6 for pivotally interconnecting the links together. On one side of each link (the left-hand side in the figure) the ears comprise continuations of the ends 4, the continuations being perforated and being curved transversely of the plane of the front plate substantially concentrically with the perforations therein. At the other side of each link (the right-hand side of the figure) the ears 6 are formed by swaging the ends 4 inwardly so that the outer face of each ear 6 lies in substantially the same plane as the inner face of the corresponding ear 5. In the swaging operation a curved recess 7 is formed outside the ear 6 to receive the ear 5 of the next adjacent link, this recess being curved to fit snugly against the periphery of the ear 5 from the inner edge of the end 4 around to the plane containing the right-hand edge of the front plate and the axis of the pivot opening in the ear 6.

Figure 5:
Fig. 5 is a longitudinal central section of a preferred form of pivot pin forming one element of the new combination.
Figure 6:
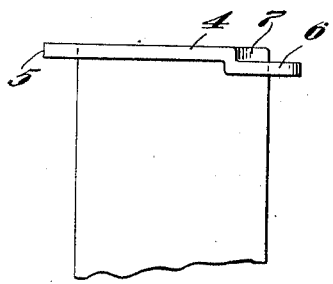
Fig. 6 is a plan view of the under or inner side of the front plate element of the bracelet.

The pivot pin 2 comprises outer tube 8 which substantially bridges the inner ears 6 of each link and pin means inside the tube having projections 9 extending from each end of the tube through the overlapping ears 5 and 6 and terminating substantially in the planes of the outer sides of the outer ears 5. In the preferred embodiment shown in the figures the pin means is in the form of a single integral pin whose diameter is slightly less than the interior diameter of the tube and which is curved slightly so as to bear against one side of the tube at the center with a spring action as shown in Fig. 5. Thus, by providing an interfitting groove and ridge on the pin and tube respectively, the pin may be retained in place with a snap action, it being understood that the interior diameter at 10 is slightly greater than the exterior diameter of the pin 9 so that the pin may be telescoped lengthwise of the tube by pressing on either end of the pin with sufficient force to cam the groove on the pin from the annular protuberance in the tube. If desired the extreme ends of the pin 9 may be slightly enlarged by swaging so as not to pass through the restriction 10 in the tube, whereby the pin 9 may not be accidentally lost from the tube.

To interconnect the links one end of pin 9 is pressed inwardly until it is flush with the end of the tube, the other end of the pin is then inserted through overlapping ears 5 and 6, the tube and pin are then swung into position wherein the bore of the tube is in alignment with the other pair of ears 5 and 6, whereupon the projecting end of the pin 9 is pressed inwardly until the retracted end is projected through the other pair of ears 5 and 6. To remove a link from the bracelet the pins associated with one link are pressed inwardly at one end of the link until the overlapping ears at that end of the link are disengaged, whereupon the link may be swung out of position and lifted bodily from the bracelet.

Figure 3:
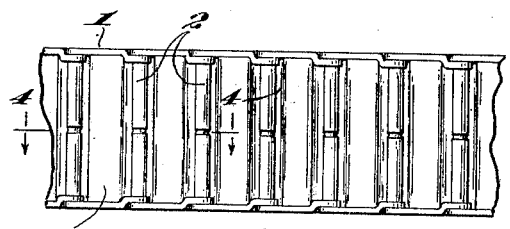
Fig. 3 is a plan view of the under side of a portion of the bracelet on an enlarged scale.
Figure 4:
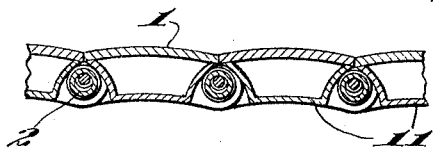
Fig. 4 is a section on line 4—4 of Fig. 3.
Figure 7:
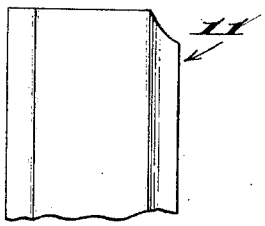
Fig. 7 is a plan view of the inner or under side of a portion of the rear or back plate of one of the links.

In order to present a smooth surface to the wrist and a neat appearance when removed from the wrist, the bracelet is also preferably provided with back plates 11 which, as shown in Figs. 3, 4 and 7, substantially bridge the ends 4 flush with the rear edges of the ends and they also substantially bridge adjacent tubes 8 substantially in the plane of the rear side of the tube, thereby substantially closing the space between the tubes. The edges of the back plate on the sides of the plate extending transversely of the bracelet are curved to extend into the spaces between the front plate and the tubes as shown in Fig. 4. Thus, the back plates are held in position by the tubes without the necessity of any additional attaching means (although additional means may be provided if desired) and the back plates do not in any way interfere with the flexing of the bracelet.

From the foregoing it will be understood that the user, merely by the use of a pin or hairpin, may remove one or more links from the bracelet to adjust the length of the bracelet to his or her wrist and that the adjusting means is not apparent, the exposed ends of the pin 9 presenting the same appearance as the ordinary pivot pin heretofore used in link bracelets of this type.

I claim:

1. A chain comprising front plates with turned-down ends having integral overlapping ears provided with registering pivot openings for pivotally interconnecting the links, a tube bridging the inner ears at each side of a link with its bore in alignment with said openings, pin means sliding lengthwise in each tube with projections extending from the ends of the tube through said openings, and separate back plates bridging said ends, at the rear edges thereof, opposite sides of each back plate interengaging between the front plate and the adjacent tubes.

2. A chain for bracelets comprising front plates, pivot pins by which the plates are hinged together, tubular means by which the pins are encased, and back plates having inturned edges engaged under said tubular means.

3. A chain for bracelets comprising front plates having turned-down ends, pivot pins by which the plates are hinged together, tubular means by which the pins are encased, and back plates bridging said turned-down ends and having inturned edges engaged under said tubular means.

4. A chain for bracelets comprising front plates, tubular means extending transversely of the chain at the joints, pivot pins telescoped within said tubular means for pivotally interconnecting the front plates, and back plates having inturned edges engaged under said tubular means.

5. A chain for bracelets comprising front plates having turned-down ends, tubular means extending transversely of the chain at the joints, pivot pins telescoped within said tubular means for pivotally interconnecting the front plates, and back plates bridging said turned-down ends having inturned edges engaged under said tubular means.

Signed by me at Providence, Rhode Island, this 11th day of October, 1928.

CHARLES R. TOST.